United States Patent [19]

Wassmer

[11] 4,029,295

[45] June 14, 1977

[54] FLUID-FLOW VALVES

[75] Inventor: Werner Wassmer, Grenzach, Germany

[73] Assignee: Hansen GmbH KG, Germany

[22] Filed: Oct. 2, 1975

[21] Appl. No.: 618,847

[30] Foreign Application Priority Data

Oct. 3, 1974 Germany .......................... 2447173

[52] U.S. Cl. .............................. 251/297; 251/331; 251/DIG. 2; 137/625.44

[51] Int. Cl.² ......................................... F16K 7/18

[58] Field of Search .............. 251/331, 297, DIG. 2

[56] References Cited

UNITED STATES PATENTS

| 359,131 | 3/1887 | Clark | 251/297 |
|---|---|---|---|
| 934,045 | 9/1909 | Cotter | 251/DIG. 2 |
| 2,948,504 | 8/1960 | Merrill | 251/331 X |
| 3,339,583 | 9/1967 | Fleckenstein | 251/331 X |

FOREIGN PATENTS OR APPLICATIONS

| 1,221,155 | 5/1960 | France | 251/331 |
|---|---|---|---|
| 804,150 | 4/1951 | Germany | 251/331 |

Primary Examiner—Arnold Rosenthal
Attorney, Agent, or Firm—Mason, Mason & Albright

[57] ABSTRACT

A valve comprises a casing having two casing parts with a resilient membrane clamped between the parts. A switching member mounted within the casing deforms the membrane in each of a plurality of different switching positions, to selectively open and close communication between a plurality of connections of the valve.

5 Claims, 9 Drawing Figures

FLUID-FLOW VALVES

BACKGROUND OF THE INVENTION

1. Field of the Invention

The present invention relates to valves, and more particularly, but not exclusively, to valves for use in filter presses.

2. Description of the Prior Art

In a filter press, the filtrate collected at the individual filter plates may be guided out into a collecting channel through a one-way valve. A valve of this kind permits only free outlet or shut-off (open filtration). However, for reasons of hygiene or for reasons of safety (for example due to the danger of an explosion) there are many products which cannot be subjected to open filtration. In this case the filtrate is led away through a collecting channel which is located within the filter press fittings and extends through them. This "closed filtration" has the disadvantage that the condition of the filtrate or that of the wash liquid in the next stage of the process cannot be checked at the individual plates. Therefore if a fault or a blockage occurs, it is sometimes necessary to take the whole press out of operation, or to re-filter the product.

For this reason, multi-way valves have been proposed for use in open or closed filtration processes as required, according to the nature of a product. Even in the case of closed filtration processes, checks may be made or specimens may be taken at individual filter plates. If lack of tightness occurs because of damaged filter cloths, it is possible to prevent the further outlet of impure filtrate at the individual plates by shutting off the valve. The previously proposed filtrate run-off valves usually operate on the throughput member principle, in which a throughput member with different bores according to the function of the valve is arranged so as to be rotatable about its longitudinal axis in a one-part or multi-part casing. However, for effective sealing, the throughput members have to be ground in, in a conical casing. Therefore exchange of individual parts is not possible. For good sealing the throughput members must move stiffly, and they can then be actuated only with difficulty. On the other hand, ease of movement mostly leads to lack of tight sealing.

Further, it is not possible to provide sufficiently large bores in a throughput member without disadvantageous change of the diameter of the throughput member and therefore of the overall height of the whole valve. However, since generally the valve forms the narrowest part of the whole filter run-off system, relatively large bores are advisable. The problem of insufficiently large bore cross-sections arises more particularly in the case of multi-way valves, because in such valves a plurality of channels run one above the other or side by side in the throughput member. Since it is desirable to make the channels as large as possible while keeping the overall height as low as possible, the sealing surfaces between the individual channels are reduced to a minimum, and this then causes lack of tight sealing particularly readily.

The valve should also be easy to operate; the throughput member must therefore be easy to turn. In general there is not sufficient in a filter press for long levers with a horizontal direction of rotation. The space is limited by the permissable spacing between plates.

For reasons of supervision the working position in which the valve is at any time should be easily discernable from outside. In the previously proposed valves this is possible only under certain conditions, because generally only a round or predominantly oval hand wheel can be used.

For reasons of cost, filtration valves may be composed of synthetic materials, for instance polypropylene, with good resistance to the active chemicals used in the filtration. These materials have, in general, the disadvantage of high thermal expansion, due to the nature of the material. Throughput member valves consisting of this material, therefore, either fail to produce tight sealing during the changes of temperature that occur during a filtration process, or else the thermal expansion at least disadvantageously affects the mobility, that is to say the operability of the throughput members. On the other hand, lack of tight sealing gives rise to problems in operation (spraying of chemicals) and leads to losses of material.

SUMMARY OF THE INVENTION

According to the present invention, there is provided in a valve, means defining a multi-part casing, said casing comprising a first casing part, a second casing part, and at least two fluid flow connections, a membrane located in the casing in between the first and second casing parts and acting as a dividing wall between these parts, a switching member mounted in the casing, said switching member having at least one switching surface bearing against the membrane, said switching member being movable into a plurality of switching positions to provide for selected communication between, or closure of, the connections and means for moving the switching member between the switching positions.

In a preferred embodiment of the invention, improved functional efficiency, safety in operation and ease of operation can be effected by an arrangement in which a resilient rubber membrane is clamped between the casing parts and the switching member is formed as a friction member with at least one switching surface which bears against the membrane and closes or releases one or more connections in each of various switching positions. At the same time the membrane separates the part of the casing in contact with the chemicals from the part of the casing containing the mechanical components of the valve, which later casing part is thereby hermetically sealed. This permanently ensures operability, because for instance crystallization and fouling will not impair the functioning of the movement mechanism. In addition, the membrane is the only part of the valve that is subjected to wear. The membrane can be removed and replaced on the filter press itself, so that long interruptions of operation are eliminated. Advantageously the switching member is pivotally movable by means of a switching lever, of bifurcated form. The switching member has two pressure contact surfaces with a projection between these two surfaces to prevent the membrane from bulging when the switching member is in certain positions. The member may alternatively be provided with contact pressure rollers or operate in conjunction with drag levers.

The switching member may alternatively be formed as a slide member without any curved surfaces.

With the preferred construction, tight sealing of the valve is always ensured even in the case of high temperature differences during the filtration cycle and even in the case of crystallization, fouling and the like. The valve may have a comparatively small flange width, but with connections having a comparatively large cross-section so that in a given unit of time substantially larger quantities of liquid can be carried than in the case of the previously proposed valves having a throughput member. Whereas in these previously proposed valves, an enlargement of the connection cross sections automatically necessitates a larger throughput member diameter, this dependency is not present in the above preferred construction. On the other hand, the small flange width of the valve permits the use of extremely thin filter plates, which again increases the capacity and leads to greater commercial efficiency.

On the side facing towards the switching surface of the switching member, a slide sheet is clamped at each end. In order to prevent lateral displacement, this sheet may also be guided by a special rib profile. The sheet may alternatively be endless, so that in this case it extends round the switching member. Instead of the sheet a closed ring of solid material may alternatively perform the same function. The slide sheet is preferably made from a material with a low coefficient of friction. By this means, displacement of the membrane during the actuation of the switching member is avoided. However, if the membrane is made from a material with a small co-efficient of friction, the intermediate sheet may, in certain cases, be dispensed with. It is also possible to provide the switching member with rollers on its switching surfaces, in order to transform the sliding movement into a rolling movement.

Two end stops are provided on one of the casing parts for the switching lever which effects movement of the switch member and these end stops define two of the switching positions thereof. In these switching positions and in a further switching position recesses are provided on the casing part, a resilient detent member carried by the switch lever engaging in these recesses. In this manner it is possible to avoid errors of operation. Also, the individual switching positions may be accurately marked by suitable inscriptions or symbols on the casing part. By means of the switching lever, the position in which the switching member is located at any time is indicated by a clearly recognisable different angular position of the lever. Accordingly, it is possible for the operators of a filter press easily to supervise the valve region of the press fittings, even from a distance, that is to say, at once to recognise wrong lever positions or different switching positions of individual plates in abnormal situations (for instance turbid running). This is particularly important in the case of the very long filter presses. To simplify assembly, the switching lever may consist of two halves which engage laterally from outside in the casing part and the switching member installed in this casing part. Preferably these halves are pressed one against the other, so as to coincide exactly, in guides (pins and bushes or tongue and groove) and are held firmly together by a hood-like cover. This cover itself is engaged by an undercut on the handle part of the lever and is thereby fixed. The cover may have a through bore in its upper part, for the purpose of pulling it out of engagement again by the application of a force, in order to facilitate assembly. Mechanisation of valve actuation is also possible by means of these bores. The handle cover can also be made in different colours, in order by this means to show the function of the valve or of the respective filter plate or the nature of the installed switching member. The connection between the two halves of the lever may alternatively be effected by screws, rivets or the like.

BRIEF DESCRIPTION OF THE DRAWINGS

Embodiments of the invention will now be described by way of example only with reference to the accompanying diagrammatic drawings, in which

FIGS. 6 to 8 are elevations, partly in section, through a second embodiment of a valve in accordance with the invention and showing three different switching positions of the valve; and, FIG. 9 is a section taken on lines IX—IX of FIGS. 5 and 6.

DESCRIPTION OF THE PREFERRED EMBODIMENTS

The valves to be described hereinafter can be used in many different applications, but for the sake of simplicity, they will be described with reference to a filter press. Further the valves particularly described have three connections, although it will be apparent that they may have more than three connections.

As shown in FIGS. 1 to 5, the valve has a casing comprising an upper casing part 1 and a lower casing part 2, which are interconnected by means of flanges and screws. The casing 1, 2 is of generally disc-like form. Three connections 4, 5 and 6 are provided in the lower casing part 1, the connections 4 and 5 communicating with a flange 9 by way of corresponding tubular pipe sections 7 and 8. The connection 6 communicates with a tubular pipe section 10, through which the filtrate can be discharged into the open. As can be seen for instance from FIGS. 3 to 5, a switch member 11 is mounted in the casing 1, 2 so as to be capable of being rotated by means of a bifurcated switching lever 12. The switch member 11 is formed as a friction member and has switching surfaces 11a and 11d; a curved surface 11c, 11b is adjacent to the switching surfaces 11a, 11d respectively.

A membrane 13 is clamped between the upper casing part 1 and the lower casing part 2 and co-operates with the member 11 in a manner to be described hereinafter. The side of the membrane 13 facing the switching surface 11a carries a sheet or layer 14 of a suitable material to provide protection against wear and to reduce friction. The membrane 13 preferably consists of a resilient and corrosion-resistant material, for instance rubber or plastics. On the upper casing part 1 two end stops 15 and 16 and two associated recesses 17 are provided; in two of its switching positions, the switching lever 12 bears against a respective one of these stops 15, 16. The two end stops 15 and 16 accordingly limit the range of pivotal movement of the switching lever 12. When the switching lever 12 engages either one of the stops 15, 16, a resilient detent member 18 carried by the switching lever 12 engages in the associated recess 17 to releasably lock the switching lever 12. The detent member 18 can consist of a resilient plastics member, a ball biassed by means of a spring, or a resiliently mounted roller. A third, intermediate, recess 17 is provided to enable the switching lever to be releasably locked in an intermediate position between the stops 15, 16. Engagement may take place on one or both sides of the upper casing part 1.

In the upper casing part 1, two lobe-shaped walls 1a and 1b (FIG. 9) are provided, which engage in the lower casing part 2 and serve as supporting surfaces for side walls 13a of the membrane 13. A part of the member 11 is mounted between walls 1a and 1b. The side walls 2a of the lower casing part 2 are parallel to the walls 1a and 1b of the upper casing part 1, as is clearly shown in FIG. 9. A gap A is defined between each side wall 2a and the adjacent wall 1a or 1b, the gap A being greater than the thickness d of the membrane 13. By this means, chambers K are formed at each side of the side walls 13a.

The operation of the valve shown in FIGS. 1 to 5 will now be described.

Figure 1:
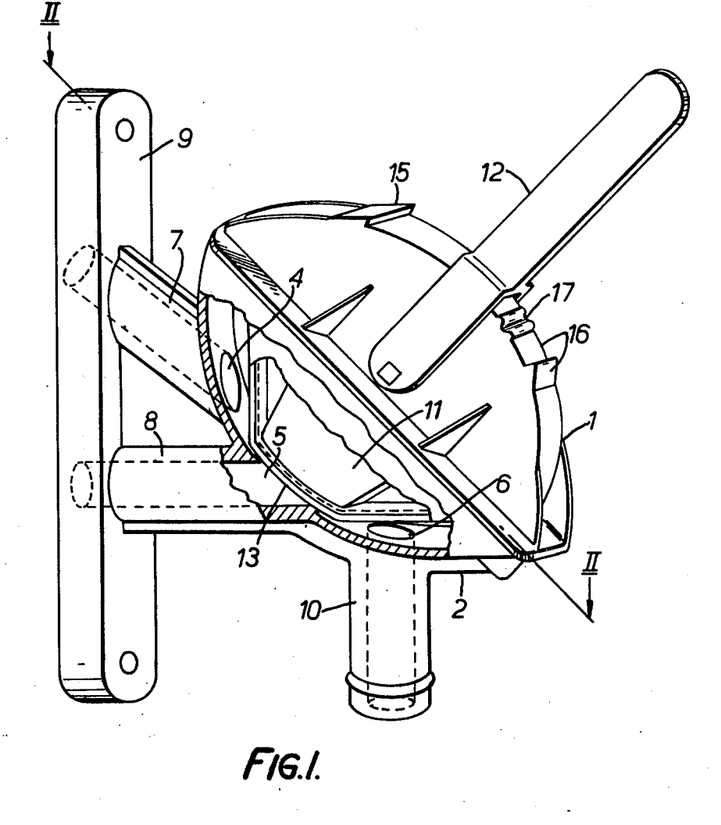
FIG. 1 is a perspective view partly in section, of a valve in accordance with the invention.
Figure 2:
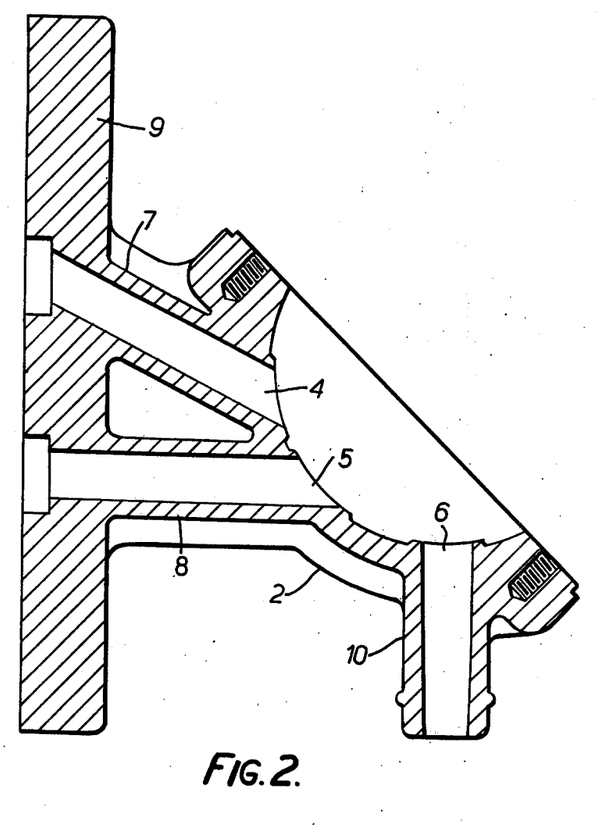
FIG. 2 is a vertical section taken on line II—II of FIG. 1.
Figure 3:
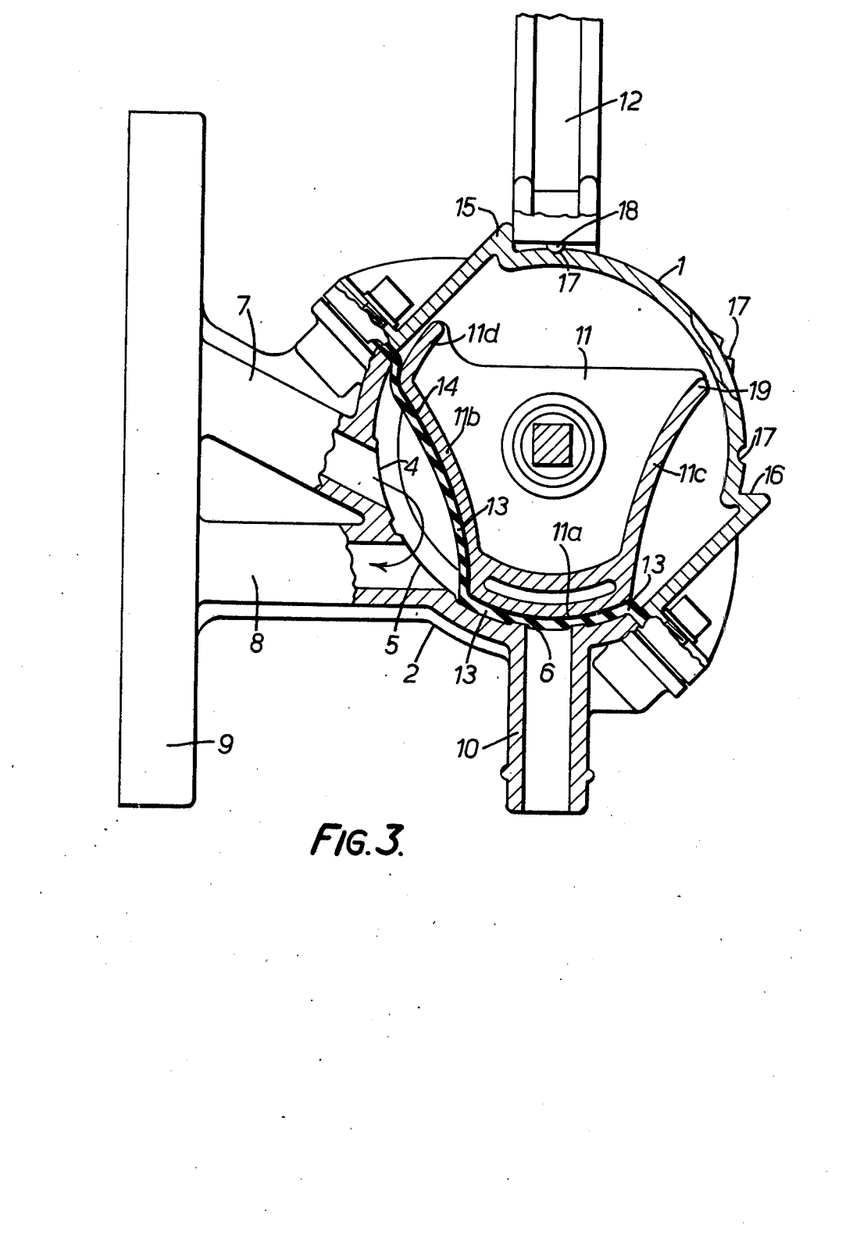
FIGS. 3 to 5 are elevations, partly in section, showing three different switching positions of the valve.

FIG. 3 shows a switching position in which the connection 6 is closed whereas communication between the two connections 4 and 5 is established. In this position, the switching surface 11a of the member 11 bears firmly against the membrane 13, so that the connection 6 is completely closed. The filtrate therefore cannot be led away to the outside through the connection 6 and the pipe 10; instead, the filtrate follows the path shown by the arrow to be fed into a lower channel of a filter plate (not shown). In this case the switching lever 12 is in one of its end positions and bears against the end stop 15 and is releasably locked in this position by the detent member 18 engaged in the associated recess 17.

Figure 4:
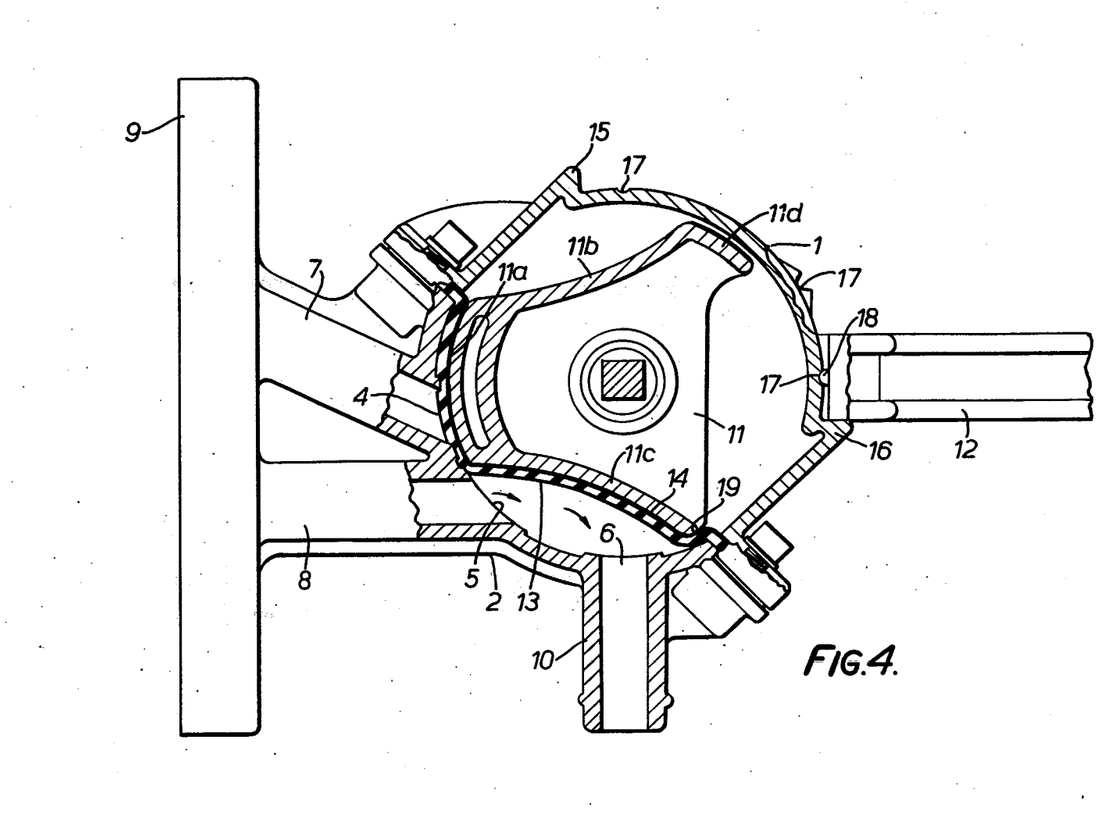

In the position shown in FIG. 4, the switching surface 11a of the member 11 closes the connection 4 by means of the membrane 13, whereas the two connections 5 and 6 communicate with one another. In this manner filtrate can be taken from the lower channel, and discharged into the open through the connection 6 and the pipe 10. In this case, the switching lever 12 is in its other end position in which it bears against the stop 16 and is releasably locked by means of the detent member 18 engaged in the associated recess 17.

Figure 5:
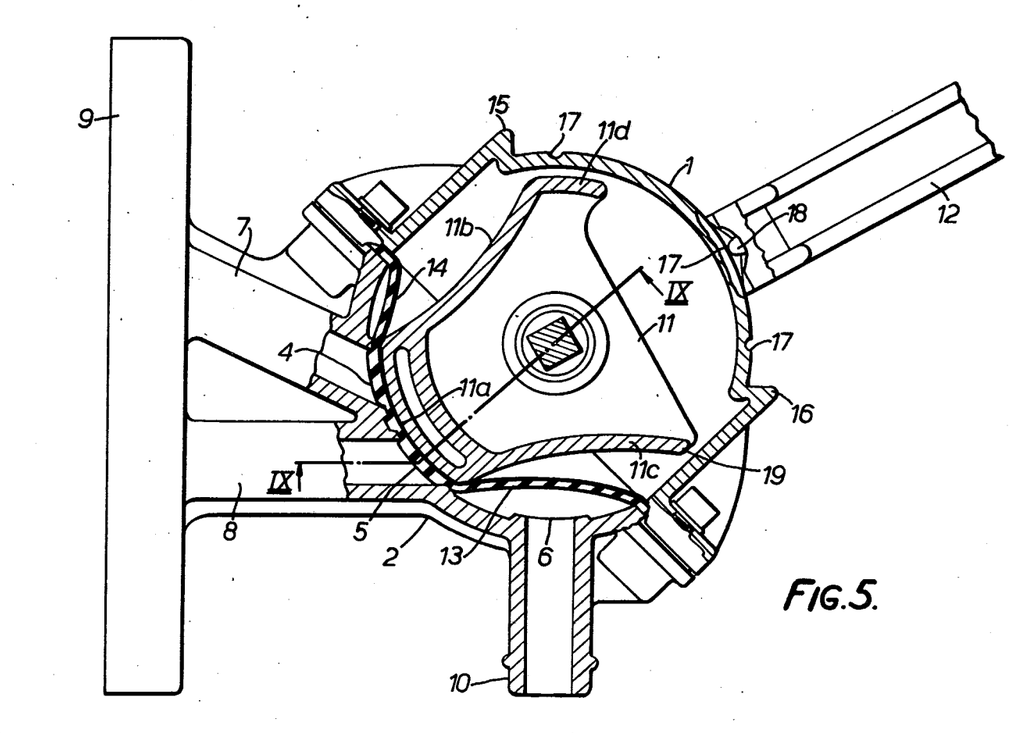

In the position shown in FIG. 5 all three connections 4, 5 and 6 are separated from one another. In this position, the switching lever 12 is an intermediate position between the two end stops 15, 16 and is releasably locked in this position by engagement of the detent member 18 in the intermediate recess 17.

In the embodiment shown in FIGS. 1 to 5, the connections 4 and 5 or 5 and 6 can be placed in communication with another but there is no possibility of establishing communication between the connections 4 and 6, which may be desirable in certain cases. This possibility is provided in the embodiment shown in FIGS. 6 to 8. This embodiment differs from that of FIGS. 1 to 5 only in that the upper casing part 1 has been released from the lower casing part 2, and is again connected with the lower casing part 2 after having been pivotally moved through 180° about the axis of symmetry. In addition, the member 11 has been replaced by a different member with a shaft set in a different angular position. In this way the upper casing part 1 and the member 11 assume the positions shown in FIGS. 6 to 8.

Figure 6:
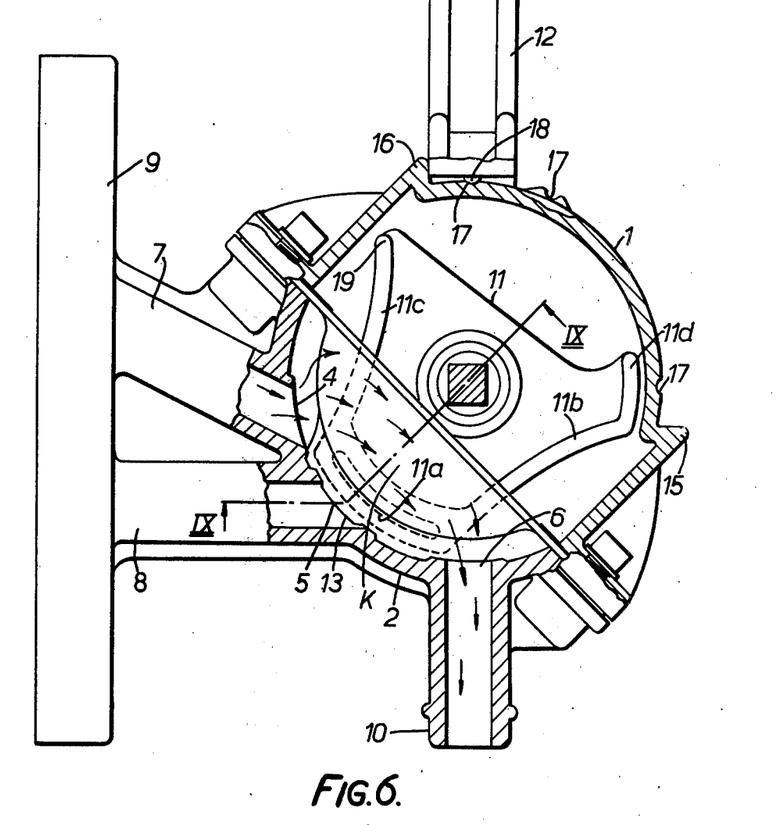
Figures 7, 9:
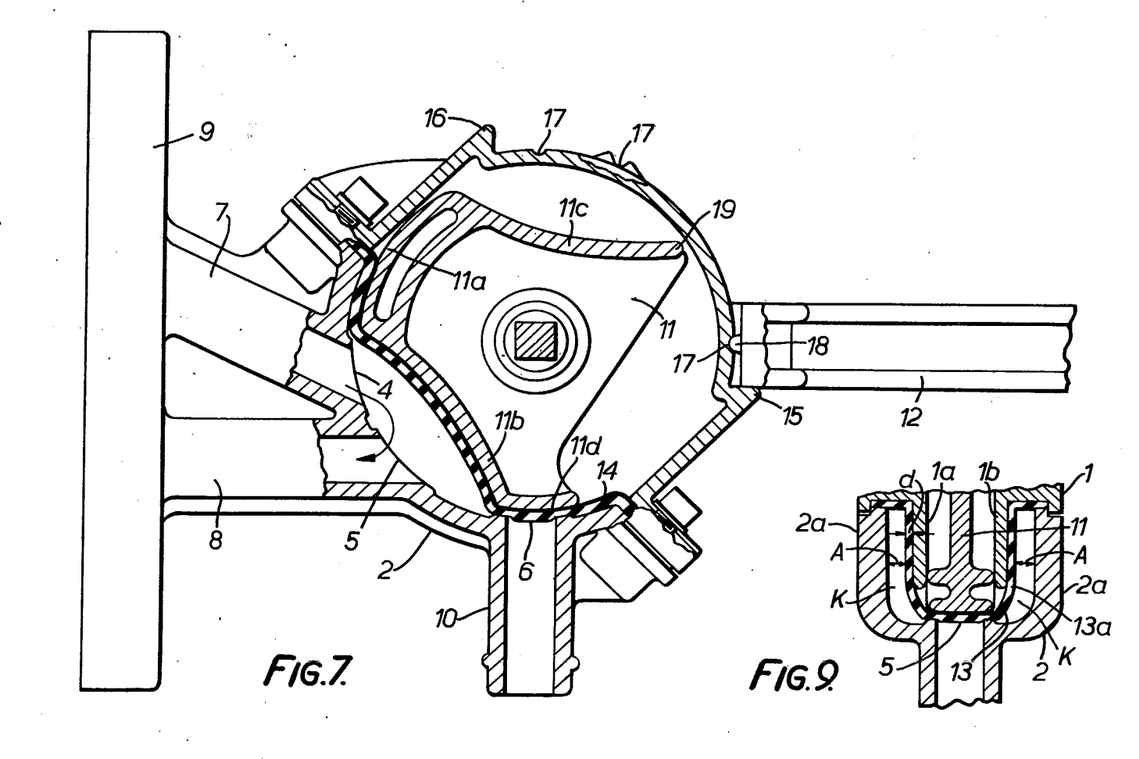

In the position shown in FIG. 6, the switching surface 11a of the member 11 bears against the membrane 13 and in this way closes the connection 5, so that the two connections 4 and 6 communicate with one another by way of the chambers K (FIG. 9). In this way the filtrate coming out of the pipe 7 can be supplied by way of the connection 6 to the pipe 10 and discharged. As shown the pipe 10 extends parallel to the screw connection flange, that is to say vertically; alternatively, however, to provide better visibility of the filtrate discharge, the pipe may be inclined to the vertical. In the FIG. 6 position, the switching lever 12 bears against the end stop 16.

In the position shown in FIG. 7, the switching surface 11d, which is adjacent to the surface 11b, and the membrane 13 together bear against the connection 6 and close this connection. The connections 4 and 5, on the other hand, are in communication with one another. This position corresponds to the position according to FIG. 3, although the switching lever 12 is not vertical but is approximately horizontal and bears against the end stop 15.

Figure 8:
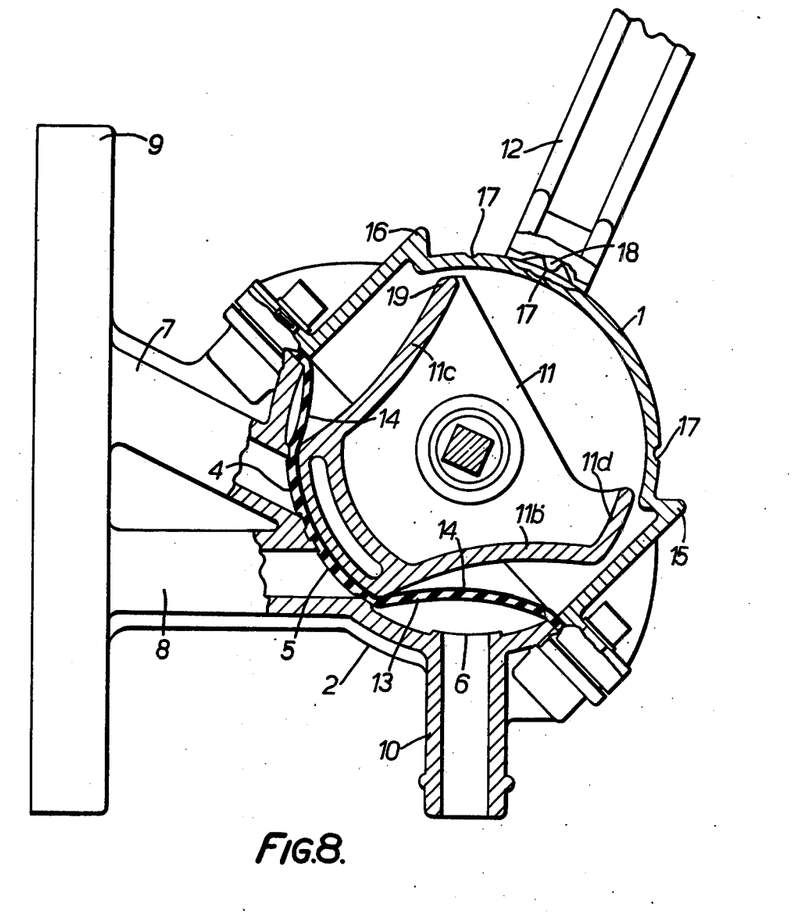

The switching position according to FIG. 8 corresponds to the position according to FIG. 5. In this case also, the detent member 18 of the switching lever is engaged in the intermediate recess 17 of the upper casing part 1. Thus, in this position all three connections 4, 5 and 6 are separated from one another.

The membrane also performs the function of a seal between the upper and lower casing parts. In order to avoid unallowable deformation of the membrane 13, the two casing parts abut against one another and thereby limit the deformation distance. At the same time the membrane 13 is thereby shielded on the outside. In order to improve the sealing effect, instead of the flat sealing surfaces it may alternatively be possible to provide profiled surfaces (lamellae, curved members and the like) which in certain cases engage in corresponding recesses of the flanges of the upper and/or lower casing parts.

The upper and lower casing parts are preferably screwed together from underneath, so that the exposed screw threads are protected from active chemicals dripping down. Preferably the switching surface 11c ends in a projection 19, which prevents the membrane 13 from bulging into the upper casing part 1 when the membrane 13 in the loaded state cannot bear against one of the curved surfaces 11b or 11c.

What is claimed is:

1. In a valve, means defining a multi-part casing, said casing comprising a first casing part, a second casing part, and at least two fluid flow connections, a membrane located in the casing between the first and second casing parts and acting as a dividing wall between these parts, a switching member mounted in the casing, said switching member having at least one curved switching surface bearing against the membrane, and first and second curved surface portions adjacent the switching surface, said first and second surface portions being curved in the opposite direction to the switching surface and said switching member being movable into a plurality of switching positions to provide a selected communication between, or closure of, the connections, means for moving the switching member between the switching positions, and means defining a projection at the end of the first curved surface portion to prevent the membrane from bulging when the membrane is subjected to pressure and cannot bear against the said first curved surface portion.

2. A valve according to claim 1, wherein the switching member has a second said switching surface adjacent to the second curved surface portion.

3. A valve according to claim 1, wherein one of said casing parts comprises two opposed walls engaged in the other casing part, said walls serving as supporting surfaces for adjacent side wall portions of the membrane and the said other casing part having sides parallel to said opposed walls of the said one casing part, said sides being spaced from said opposed walls by a distance greater than the thickness of the membrane.

4. A valve according to claim 1 wherein the switching member is pivotally mounted within the casing.

5. A valve according to claim 1, further comprising means defining a layer on the side of the membrane facing towards the switching surface.

* * * * *